United States Patent [19]

De Forest et al.

[11] Patent Number: 4,918,938

[45] Date of Patent: Apr. 24, 1990

[54] HEAT EXCHANGER

[75] Inventors: Lockwood De Forest, Mosman; Ian D. Roberts, Nunawading; Christoper W. S. Dixon, Brighton, all of Australia

[73] Assignee: Siddons Industries Limited, Victoria, Australia

[21] Appl. No.: 179,450

[22] Filed: Apr. 8, 1988

Related U.S. Application Data

[63] Continuation-in-part of Ser. No. 819, Jan. 6, 1987, abandoned.

[30] Foreign Application Priority Data

Jan. 8, 1986 [AU] Australia .............................. PH4142

[51] Int. Cl.$^5$ ......................................... F25B 27/00
[52] U.S. Cl. ................................. 62/238.6; 165/169; 126/447
[58] Field of Search ............... 165/156, 159; 62/238.6, 62/238.7, 505; 237/19, 2 B; 126/447

[56] References Cited

U.S. PATENT DOCUMENTS

| | | | |
|---|---|---|---|
| 2,716,866 | 9/1955 | Silva | 62/238.6 |
| 4,048,980 | 9/1977 | Googin et al. | 126/447 |
| 4,080,956 | 3/1978 | Dawley | 126/447 |
| 4,270,359 | 6/1981 | Hummel | 62/238.7 |
| 4,290,275 | 9/1981 | Disco et al. | 62/238.6 |
| 4,452,050 | 6/1984 | Pierce | 165/169 |
| 4,484,454 | 11/1984 | Sugiyama | 62/505 |

FOREIGN PATENT DOCUMENTS

| | | | |
|---|---|---|---|
| 509901 | 10/1978 | Australia . | |
| 3325137 | 1/1985 | Fed. Rep. of Germany | 165/169 |
| 1466980 | 3/1977 | United Kingdom | 62/238.6 |

*Primary Examiner*—Noah P. Kamen
*Attorney, Agent, or Firm*—Nixon & Vanderhye

[57] ABSTRACT

A water heater includes a metallic water tank having a generally vertical orientation in use. A tube for carrying a refrigerant fluid is heat-conductively bonded about the outer surface of the wall of the tank while held under tension. The tube is formed of a material having a coefficient of thermal expansion similar to the material of the tank. The tube extends from a position below a cold water inlet at the bottom of the tank to a position approximately 66% of the height of the tank. An evaporator is positioned for exposure to ambient conditions and has a passage for carrying the refrigerant fluid. A compressor is connected to the passage and to the tube to circulate the fluid through the tube and to the evaporator.

20 Claims, 4 Drawing Sheets

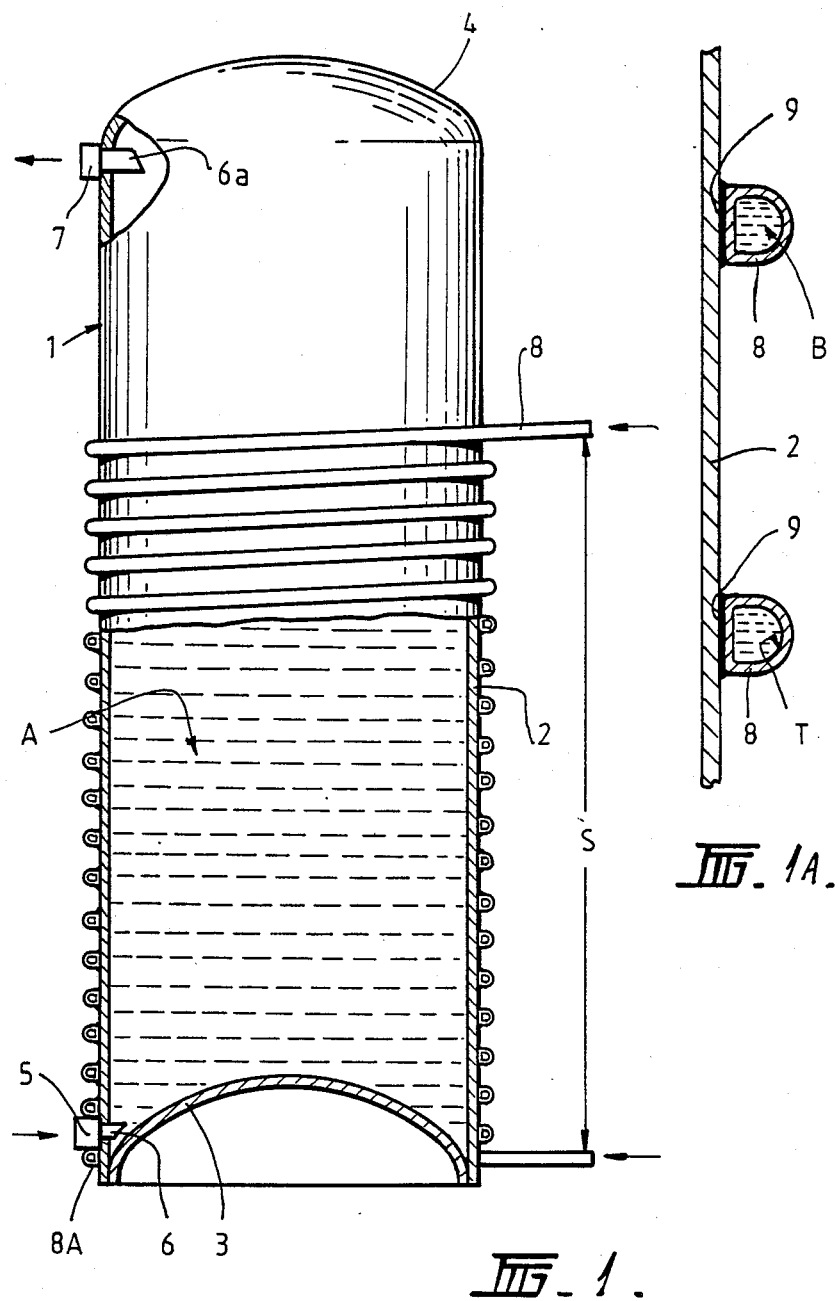

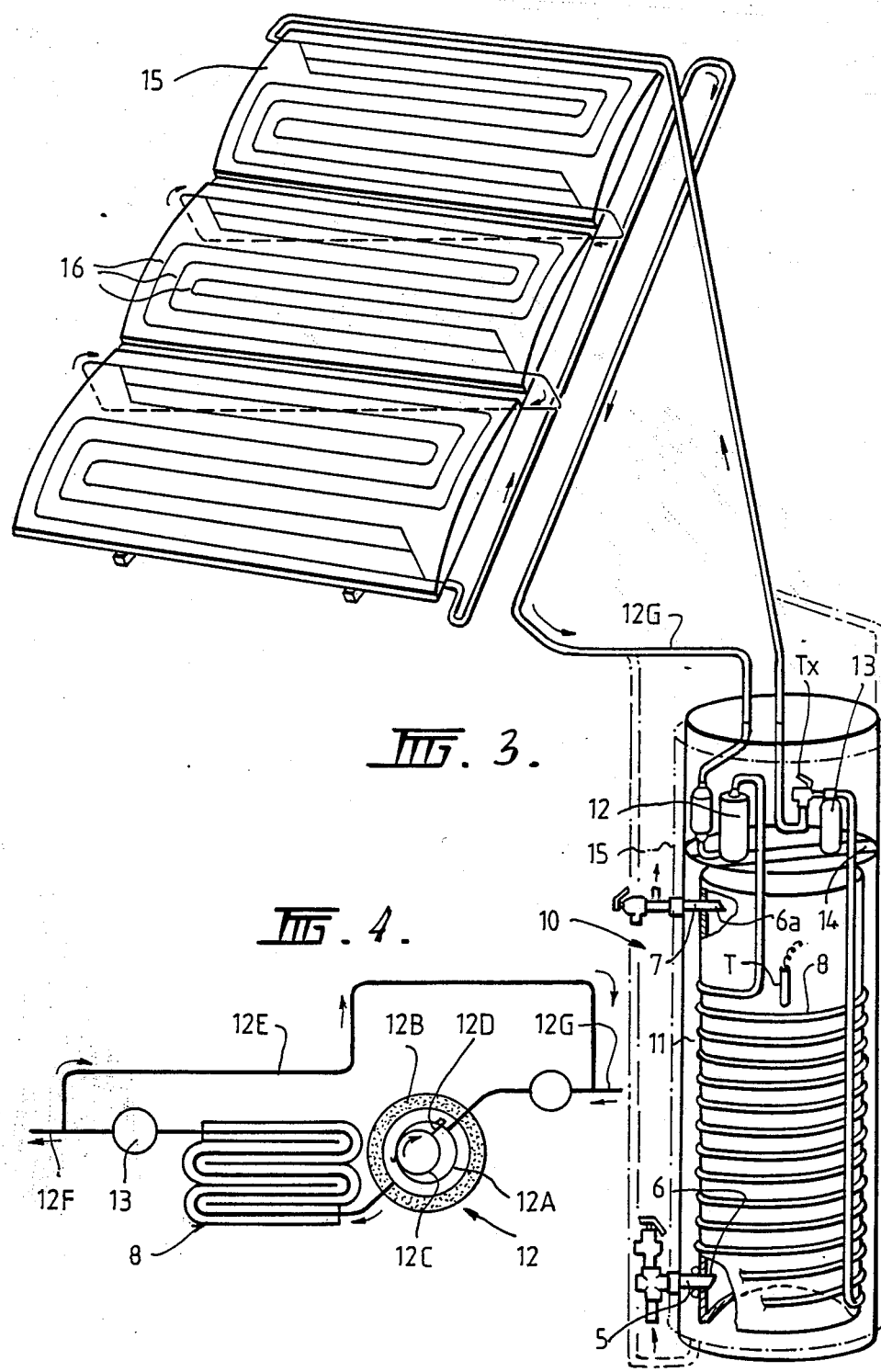

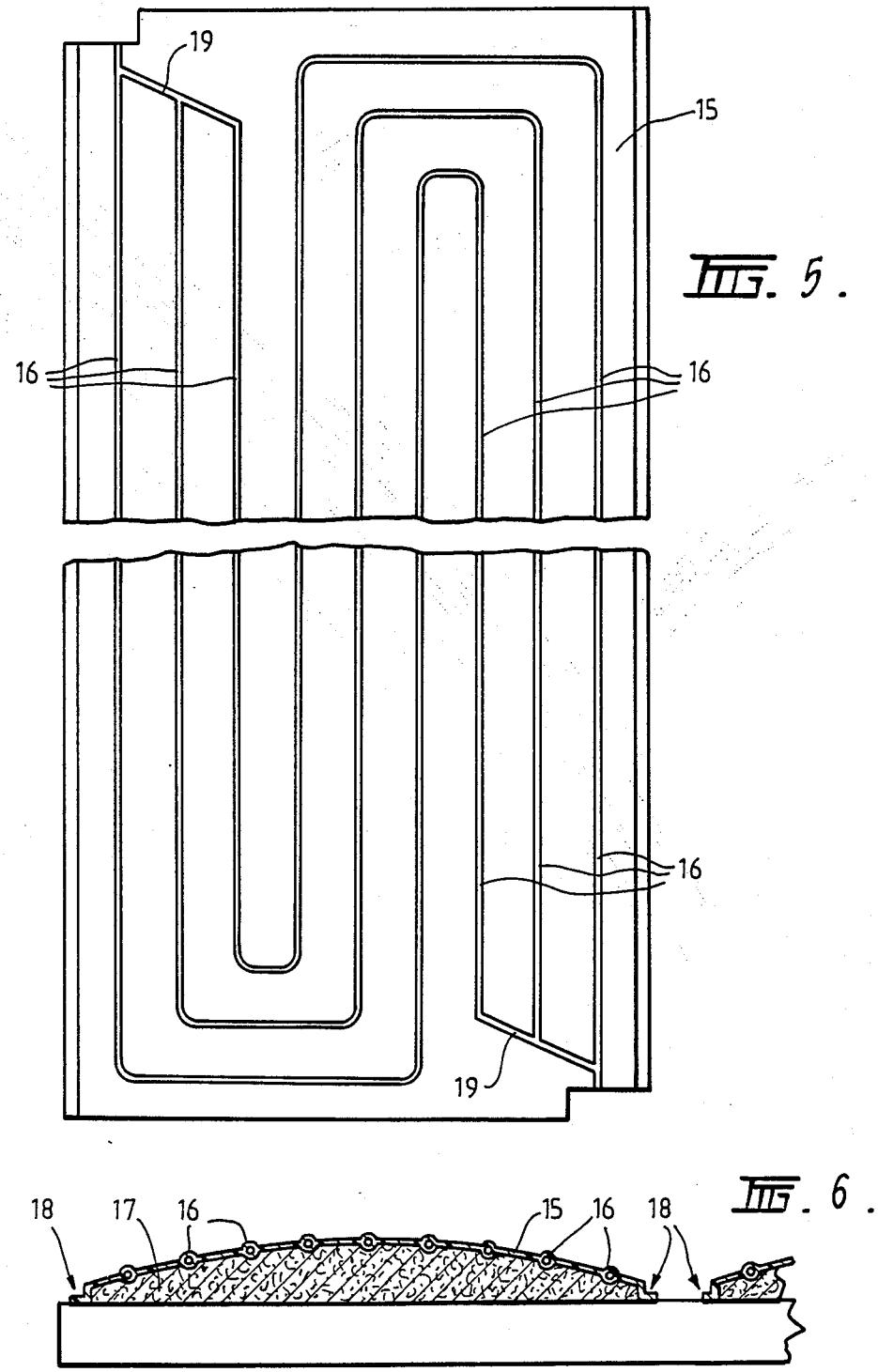

HEAT EXCHANGER

CROSS-REFERENCE TO RELATED APPLICATION

This application is a continuation-in-part of U.S. patent application Ser. No. 000819 dated Jan. 6, 1987, now abandoned.

FIELD OF THE INVENTION

This invention relates to improvements in water heaters, and more particularly solar boosted heat pump water heaters having an improved heat exchanger arrangement.

BACKGROUND OF THE INVENTION

The use of solar energy to supplement water heating systems is becoming increasingly practical with developments in technology. In Australian Pat. No. 509901 there is described a solar boosted heat pump system which converts solar energy particularly efficiently and transfers that energy by the use of a refrigerant heat pump.

In developing a solar boosted heat pump system for the heating of domestic water, the inventors tested various heat exchange systems for transferring the heat from the refrigerant circulated by the heat pump to the water to be heated. One such arrangement included the immersion of a finned tube carrying the refrigerant in a tank containing the water to be heated. This arrangement was thought to provide the most efficient means of transferring heat from the refrigerant to the water to be heated even though the system was expensive to manufacture. However, testing of the system showed that it was impractical due to the fact that the spaces between the fins tended to fill with the sediments commonly found in some domestic water supplies. Although attempts were made to redesign the finned tube to avoid the collection of sediments, the problem could not be overcome.

A number of attempts to provide heat pump water heaters may be found in the patent literature. For example, U.S. Pat. Nos. 2,716,866 Silva and 4,452,050 Pierce, and United Kingdom Patent No. 1,466,980 Cromarty, each show water heaters having a refrigerant carrying tube surrounding a heat exchanger tank containing water to be heated. In each of the above examples, the heat exchange system is both complex and expensive due to the use of a number of separate windings (or winding sections, in the case of Cromarty) aimed at extracting the higher temperature superheat from the refrigerant fluid carried by the tubes. The use of separate windings or winding sections increases the material and manufacturing costs of the heat exchanger, and the inventors believe that these costs are not justified by the benefit which may be achieved by extracting the superheat from the refrigerant fluid. Furthermore, none of the systems described in the above literature envisages use of the system in association with a solar evaporator.

Of course water heating systems utilising solar energy are known, and one such system is described in U.S. Pat. No. 4,282,861 Roark. However, this system uses the water to be heated as the heat transfer medium and such a system does not have the required efficiency to function adequately as a domestic or industrial water heating system.

The patent literature also contains numerous examples of heat exchange systems in which pipes are attached to tanks, such as United Kingdom Patent No. 377398 Bishop et al and German patent application No. P3325137 Knabben et al, but these disclosures are not directed towards heat pump systems in which the heat transfer fluid is a refrigerant or the like. For example, the Bishop et al patent pipes steam around a cooking pan and as such is impractical for application to a domestic water heater. In the case of Knabben, the invention is concerned with the shaping of the tube to maximize contact between the tube and the heat exchange tank, and the heat exchange medium is not even discussed. Thus, while patents such as the above disclose the attachment of heat exchange tubing to the lower portion of a liquid containing tank, the earlier mentioned patents directed to systems using refrigerant as the heat transfer medium would suggest that such a limited use of exchange tubing would not be satisfactory for a system using a heat pump.

BRIEF SUMMARY OF THE INVENTION AND OBJECTS

It is an object of the present invention to provide a heat exchange system which does not suffer from the above disadvantage and which nevertheless provides efficient transfer of heat contained in a heating medium to water contained in a tank.

The invention therefore provides a water heater comprising a water tank having a wall formed from material having heat transfer properties, a cold water inlet adjacent one end of the tank, a hot water outlet adjacent the other end the tank, a tube adapted to carry a refrigerant fluid, heat conductive bonding material substantially coextensive with the length of said tube securing said tube and said tank wall substantially continuously one to the other with the tube and heat conductive bonding material in heat conductive contact with the external surface of said wall of said tank to transfer heat from condensation of refrigerant fluid in said tube through said wall to the water contained in the tank, said tube extending from a position adjacent said one end of the tank to a position not exceeding about 75% of the length of said wall of said tank, an evaporator positioned to be exposed to ambient conditions and having a passage for carrying refrigerant, and a compressor connected to said passage and to said tube to circulate refrigerant fluid through said tube and to said evaporator.

In considering alternatives to the finned tube arrangement described above, conductive bonding of the refrigerant carrying tube to the external surface of the water tank was initially discarded as being likely, on theoretical considerations, to be too ineffective to warrant further consideration. However, after all other alternatives failed to produce acceptable results and a system of this type above was tested, it was surprisingly discovered that the heat transfer achieved by this system was in fact more effective than the heat transfer achieved by the finned tube system. Moreover, it was further determined that the tube should be attached to extend from a portion adjacent the bottom or coldest region of the water tank to a position not exceeding about 75% of the height of the tank since the attachment of the tube above a certain height was found to not materially improve the heat transfer properties of the heat exchange system under operating conditions on which the top portion of the water is likely to be hot. This of course resulted in a saving in material costs.

In a preferred embodiment of the invention, the tank is a vertically standing cylindrical tank and the tube extends from a position adjacent the bottom of the tank to a position approximately 50% to 70% of the height of the tank. It will be appreciated that although this arrangement is presently preferred, other arrangements in which the tube extends to a position from 50% to 75% of the height of the tank may be satisfactory. Similarly, while the use of a vertically standing cylindrical tank is presently preferred, the invention is equally applicable to a horizontally disposed tank of cylindrical or other suitable shape with the turns of said tube attached to the lower or downwardly inclined surface of the tank.

The turns in the tube conductively contacting the wall of the tank are preferably spaced by a distance which optimizes the heat transfer between the heat transfer medium and the water to be heated and at least one turn of the tube is preferably located under the cold water inlet.

The tube may be attached to the external surface of the wall of the tank by means of a heat transferring bonding material such as solder. Alternatively, the tube may be flattened and mechanically held in contact with the wall of the tank although the use of a heat transferring bonding material is preferred to ensure proper heat transfer.

The water tank wall is preferably of cylindrical metallic (e.g. steel) construction having a concave bottom wall and a convex top wall and the tube is preferably made of the same material to reduce the likelihood of heat transferring contact being lost due to the different coefficients of expansion of the tank and tube.

In another aspect of the invention, there is provided an evaporator/collector made from flat sheet material having a passage through which heat transfer fluid is circulated in heat conductive relationship with said panel, said panel being secured to a support which holds the panel in an outwardly bowed configuration to thereby increase the effective strength of the panel.

In one form of the invention, the panel is held in its outwardly bowed configuration by means of a shaped former, which may be made for example from an insulating material, such as insulating foam, said panel being held against said former so that it assumes the profile of the former. Although insulating foam is easily shaped to produce a convenient and inexpensive former, any suitable material may be used.

In a still further aspect of the invention, there is provided an evaporator/collector panel having a plurality of passages through which heat transfer fluid is circulated in a heat conductive relationship with said panel, said passages being interconnected at either end by means of a manifold passage, the passage which is first connected to the manifold passage at one end of the panel being last connected to the manifold passage at the other end of the panel.

BRIEF DESCRIPTION OF THE DRAWINGS

One presently preferred embodiment of the invention is shown in the accompanying drawings in which:

FIG. 1 is a fragmentary sectional elevation of a water tank incorporating a heat exchanger suitable for use with the water heater embodying the invention;

FIG. 1A is an enlarged fragmentary sectional elevation of portion of the tank showing the attachment of the tube thereto;

FIG. 3 is a schematic diagram showing the layout of a solar boosted heat pump water heating system embodying the invention;

FIG. 4 is a schematic diagram showing an arrangement for cooling the compressor used in the system of FIG. 3;

FIG. 5 is a schematic diagram showing one layout of the refrigerant passages in the solar collector used in the system of FIG. 3; and FIG. 6 is a sectional side elevation of one of the solar evaporator/collectors used in the system of FIG. 3.

DESCRIPTION OF PREFERRED EMBODIMENT

Figure 2A:
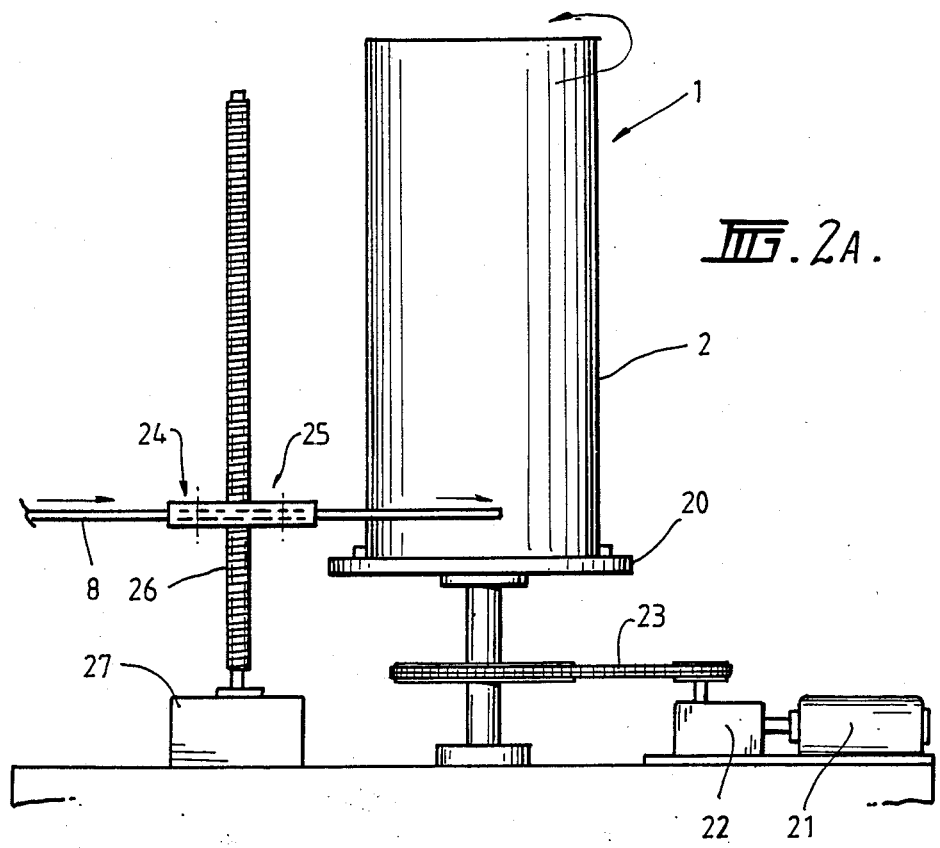
FIG. 2A is a schematic elevation of mechanism for applying the tube to the tank.

Referring to the drawings, the heat exchange system will be seen to comprise a water tank 1 having a cylindrical wall 2, a bottom wall 3, a convex top wall 4, a cold water inlet 5 adjacent the bottom wall 3 incorporating a diffuser or diverter 6 and a hot water outlet 7 adjacent the top wall 4. While the bottom wall 3 is shown to be concave, it may be convex if desired. A tube 8 carrying a refrigerant, such as refrigerant R12, is wrapped around the external surface of the tank wall 2. The tube 8 is preferably flattened as shown in FIG. 1A, so that it is D-shaped in cross-section, and the flattened portion is heat conductably bonded to the surface of the wall 2 by means of solder 9 or the like. To ensure the best possible contact during soldering and during expansion and contraction of the tube and tank wall 2 in use, the tube 8 is wound around the tank 1 under an applied tension of the order of 1,286N. This may be achieved in the manner shown schematically in FIG. 2A of the drawings.

As shown in FIG. 2A, the tank 1 is supported on a rotating table 20, which is rotably driven by a motor 21 through a gear box 22 and chain drive 23. A suitable length of tube 8 is fed by feed rollers 24 and deformed into the D-shape shown in FIG. 1A by deforming rollers 25. The feed rollers 24 and the deforming rollers 25 form part of an assembly including a nut engaging a feed screw 26 which is rotatably driven by a motor 27 to move the assembly up the tank 1 at the required rate relative to rotation of the table 20 so that the tube 8 is wound around the tank with the required spacing between adjacent turns.

Figure 2B:
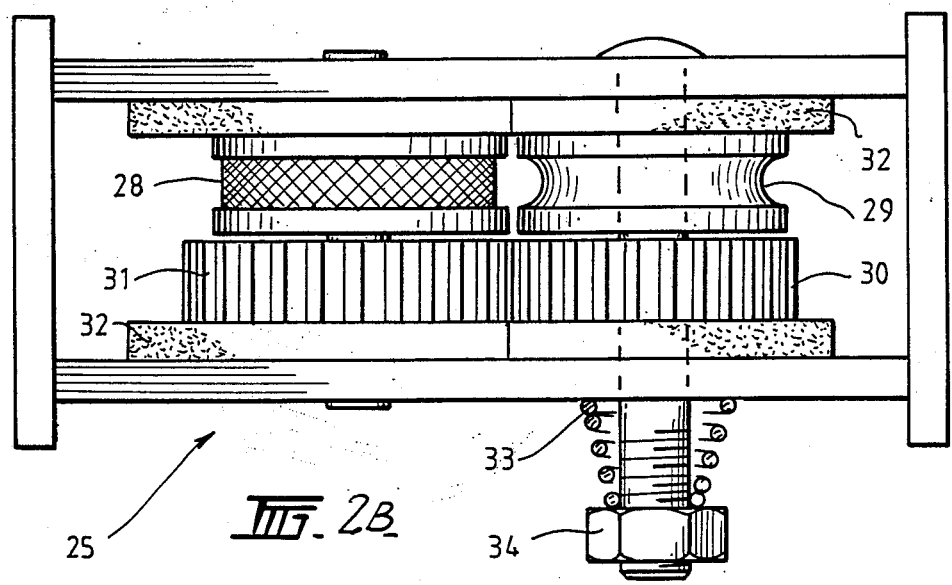
FIG. 2B is an enlarged schematic elevation of the tube deforming rollers shown in FIG. 2A.

As shown in greater detail in FIG. 2B, the deforming rollers 25 include a knurled roller 28 and a grooved support roller 29. The rollers 28 and 29 are driven by gears 30,31 which are driven at the same speed as the pinch rollers 24 to ensure that the tube 8 is fed and deformed at the same rate. The pinch rollers 24 and the rollers 28 and 29 are restrained against free rotation by means of brake pads, such as those shown in FIG. 2B at 32. The tension applied to the tube may be adjusted by clamping the brake pads 32 into engagement with the roller 29 and gear 30 under the influence of a spring 33 which is adjustably compressed by means of a tension nut 34.

In the present embodiment, the part of the tank 1 to which the tube 8 is to be fixed is cleaned and a copper flash is applied in a known manner. The tube 8 is then fixed by spot welding to the bottom of the tank wall 2 and the tube 8 is then wound around the tank using the mechanism shown in FIG. 2A of the drawings. A tin/lead solder paste is applied to the flat portion of the tube 8 as it is wound onto the tank 1 and once the tube has been completely wound, the upper end thereof is fixed to the wall 2 of the tank 1 by spot welding to maintain the tube 8 under tension. The tank 1 with an attached tube 8 is then heated in an oven to melt the solder and complete the formation of the heat transfer bond between the tube 8 and the wall 2 of the tank 1.

The tube 8 extends from the position adjacent the bottom wall 3 to a position approximately two thirds of the overall height of the tank 1 and defines a heat exchange surface S on the wall 2. The lowermost turn 8A of tube 8 is located under the cold water inlet 5, which is usually cold, and this causes sub-cooling of the refrigerant whereby it is rendered stable enough for transportation. The tube 8 is connected to a solar boosted heat pump (FIG. 3 as described below) of the general type described in Australian patent No. 509901, although it will be noted that modifications to that system have been made in the system described further below. Other forms of heat pump may also be used and the heat exchange medium carried by the tube 8 may be varied as desired.

It will be appreciated that by attaching the refrigerant carrying tube 8 to the external surface of the tank 1, a double-wall effect is automatically achieved and the protection required by the relevant water authorities, which stipulates a double walled tube where a refrigerant carrying tube is associated with water, is satisfied. Both the tube 8 and the tank 1 are preferably made from a similar material, or at least from materials having similar coefficients of thermal expansion.

In the present case, the tube 8 and the tank 1 are fabricated from steel or stainless steel. For example, the tube may be Bundyweld steel tubing while the tank 1 may be made from mild steel. As mentioned above, the thermal bond between the tube 8 and the tank 1 is maintained by the winding of the tube 8 around the tank 1 under tension. Where materials having slightly different coefficients of thermal expansion are used, the different rates of expansion and contraction of the materials may be compensated for by increasing the winding tension of the tube 8 in the manner described above. In any event, the winding of the tube under tension ensures that the thermal bond is maintained notwithstanding the flexing of the materials caused by expansion and contraction in use.

Furthermore, the described heat exchange arrangement is eminently suitable for use with a fluid A, such as water which is likely to contain precipitatable contaminants since a major portion of the heat exchanger surface S is vertical whereby the accumulation of precipitates on the heat exchanger surface is discouraged. Still further, the heat exchanger surface S is sufficiently enlarged to allow for the application of coatings, such as vitreous enamel, while still maintaining the product of heat transfer coefficient and surface area at an efficient level and minimizing the temperature difference between the fluid to be heated A and the heat exchanger surface S.

The area of the heat exchange surface S is selected so as to give the best compromise between the following conflicting requirements:

(a) The requirement that the heat exchanger surface be substantially vertical, downwardly facing or downwardly sloping as discussed above;

(b) The requirement that the heat flux density within the fluid A to be heated should be low enough to prevent destabilization of unstable components within the fluid whereby the maximum temperature difference between the heat exchanger surface S and the fluid A is limited so that fluids in contact with the surface are not locally heated to a point where the fluid A reaches some critical destabilization temperature, and (c) The requirement that the heat exchanger surface S should be as compact as possible so that it is in the coldest region of the vessel.

Requirement (c) minimizes the irreversibility of the system of which the heat exchanger is a part which implies that the temperature at which heat is being transferred between the refrigerant B and the fluid A to be heated is as close as possible to the coldest sink temperature of fluid A. By making the heat exchanger compact the passive volume of the vessel is increased. This volume acts as a stored volume of fluid ready for delivery to the end user of the fluid A.

To enable the heat exchanger to be both compact and efficient, the spacing between the turns of tubing 8 and the flow rate of the refrigerant or other heat transfer fluid B must be optimized so as to give adequate fluid side surface area S, heat transfer medium side surface area T, heat transfer coefficients, heat exchanger fin efficiency and adequate passive storage if required. The requirements of this optimization is always a compromise and depends largely on the size of the system and the fluids in use. For the system shown in the preferred embodiment, having a vessel height of the order of 1520 mm, a surface height S of 1000 mm, and a turn spacing of 55 mm has been selected.

In general terms the design procedure for the above preferred embodiment can be summarized as follows:

Considering the passive storage volume requirement and the stratification of fluid A, the surface area S is made as compact as possible until the benefits outlined above are negated by the increase in heat transfer temperature difference across surface S caused by the reduction in area available to transmit the desired total heat flux.

The spacing and sizing of the tubes on the outside face of the heat exchanger surface S is then determined by established engineering design procedures involving consideration of internal tube heat transfer, tube to wall bond conduction and fin efficiency.

Reconsideration of the surface area S determined may then be necessary if the tube spacing computations reveal that further optimisation of the design is possible through some compromise with surface area S.

To avoid degradation of the stored volume of the fluid through mixing with fluid which has yet to be fully heated or cooled, stratification of fluids which are at different temperatures should be promoted as far as possible. To this end the entry and exit conduits are arranged so as not to promote mixing by stirring up the fluid A. Also the cold conduit 5 is positioned at the bottom of the tank and the hot conduit 7 at the top of the tank. To achieve a reduction in stirring, it will be noted that the axis of the entry conduit 5 is perpendicular to the axis of stratification. In addition a downwardly facing diffuser-deflector 6 is used at the cold water inlet 5 while an upwardly facing diffuser-deflector 6a is used at the hot water outlet 7 to further reduce mixing and stirring.

The heat exchanger should preferably be arranged so that the counter-flow principle is embodied as this further improves heat transfer. In the embodiment shown, it will be noted that the refrigerant B flows from the top of the coiled tube 8 to the bottom.

A preferred solar boosted heat pump water heating system is shown schematically in FIG. 3 of the drawings and will be seen to include a heat exchange system embodying the invention in which the tank 1 and refrigerant carrying tube 8 is enclosed in a housing 10 containing insulating foam 11. For convenience, the compressor 12 and receiver/filter/drier 13 of the heat pump system are mounted on a refrigeration chassis 14 located on top of the tank housing 10. This arrangement avoids the need for the housing 10 to be supported at an elevated position to allow location of the compressor and receiver under the tank housing as is usual, thereby reducing construction costs.

The compressor 12 is preferably a rotary compressor, although other forms of refrigerant compressors may be used without materially detracting from the efficiency of the system. A rotary compressor is preferred because of its relatively smooth quieter operation. Furthermore, a rotary compressor is able to accept slugs of liquid on the suction side of the compressor whereas other types of compressors have greater difficulty accepting such slugs. These slugs may occur in a solar boosted heat pump due to the rapid variations in temperature which may be experienced as a result of changing weather conditions.

To reduce heat losses from the system to a minimum, the compressor 12 is preferably externally insulated. To compensate for the heat build up caused by such external insulation, the compressor is cooled by bleeding refrigerant from the outlet of the condenser or receiver directly into the inlet suction line or into the "suction side" of the cylinder through a bypass line which is preferably controlled by a control valve, capilliary tubing or fixed orifice (not shown). One arrangement for achieving this is shown schematically in FIG. 4 of the drawings and will be seen to comprise a cylinder 12A enclosed within an insulating casing 12B and containing a rolling piston 12C and vane 12D. A liquid injection tube 12E is connected from the refrigerant liquid line to the suction line 12G into the compressor 12. By this arrangement, heat which would normally have been wasted to the air is passed to the water in the tank through the condenser. It has been found that the arrangement shown in FIG. 4 works more reliably than injection directly into the cylinder as used in commercially available compressors.

The system includes a thermostat control system including a thermostat T,
More complex thermostat variations are possible, including:
(a) a variable or dual thermostat setting which depends on the level of sunlight, or
(b) sensing evaporation temperature when the unit is running and using this as an indication of the potential performance which in turn increases or decreases the thermostat set point.

The overall aim of the above described systems is to bias the system towards running during the day by making it raise the water to a higher temperature during daylight hours than during the night. Further sophistications are possible by making the set point of the thermostat a function of solar radiation and ambient air temperature although control "intelligence" is required in this case so that adequate water temperatures are reached during the winter. Similarly, biassing the system to operate primarily during a low tariff (off-peak) period is possible.

The compressor 12 and the receiver 13 are connected to a series of solar evaporator plates 15 which are located in a position exposed to the sun. Each evaporator plate contains a number of refrigerant passages 16 which are preferably arranged in the configuration shown in FIG. 5 of the drawings. Each evaporator plate 15 is made from two sheets of metal which are bonded together, except in the regions of the passages 16, by the so-called Roll-Bond (Trade Mark) process, which is well-known in the art. Since the evaporator plates are formed from thin sheet metal, each evaporator plate is supported in an outwardly curved profile as shown in the sectional elevation of FIG. 6 of the drawings. The outwardly curved profile is maintained by the positioning of a molded insulating foam former 17 behind each plate 15, the assembly being supported by two bearers as shown in FIGS. 3 and 6 of the drawings. Each evaporator plate 15 is further strengthened by the formation of an angle section 18 along each longitudinal edge of the plate 15. The evaporator plate arrangement described above has been found to perform well in wind tests conducted to assess its ability to withstand wind forces of the type encountered when the evaporator plate is mounted on the roof of a dwelling.

As will be appreciated from FIG. 5 of the drawings, each evaporator plate is formed with three separate parallel refrigerant passages 16 connected at either end by a manifold 19 to which the refrigerant lines (not shown) are connected. The plates 15 are, as shown in FIG. 3 of the drawings, connected in series so that the outlet manifold of the first plate is connected to the inlet manifold of the second plate and so on. As will be further seen from FIG. 5 of the drawings, the first passage connected to a manifold at one end of the plate is the last passage connected to the manifold at the other end of the plate to assist in equalizing the flow of refrigerant in the parallel passage 16. The cross sectional area of the manifold is reduced after each junction to further assist in flow equalization. The arrangement minimizes the cross sectional area of the manifold and its junctions for a given design pressure drop across the manifold. This results in an improved burst pressure for a given refrigerant pressure drop compared with the performance of the typical "waffle" type distributor used in other "Roll Bond" evaporators.

As a result of these features the evaporator plate can be used with high evaporation pressure refrigerants such as R22 without incurring a high pressure drop across the evaporator. Furthermore the evaporator may be mounted at downward sloping angles, as is usually desired, as flow equalisation between passages 16 is relatively unaffected by the forces of gravity which usually cause the lower-most passage to be favoured. Refrigerant fluid is delivered to the top of each plate 15 rather than to the bottom, as is usually the case, and this allows the use of less refrigerant since the plates do not need to be flooded as is the case with bottom entry. An additional advantage is that positive oil return is achieved since the oil does not tend to accumulate at the bottom of the plates as it does with bottom entry. Top entry of the refrigerant in combination with high velocity refrigerant circulation causes annular flow of wet fluid in the passages 16 which improves the heat transfer from the plates to the fluid. In this mode of operation refrigerant gas flows within the wet fluid annulus.

A liquid trap is provided prior to returning the refrigerant to the compressor suction to prevent any accumulation of liquid in the plates 15 while the system is off from flowing by gravity down into the compressor suction. The trap must be sized such that oil is carried over with the refrigerant gas during operation.

It will be noted from FIG. 3 of the drawings that the TX valve in the liquid line is located inside the refrigeration chassis 14 rather than at the evaporator plates 15 as is usually the case. Although compensation must be allowed for the location of the TX valve in this position, it has been found that valve performs in a superior manner in this location and manufacture of the system is simplified by the location of the valve in this position. The TX valve is preferably internally equalized and biased to give an appropriate superheat by setting to a negative superheat setting.

While the evaporator plates are shown in the above embodiment as being mounted in a position exposed to the sun, the plates may be mounted on the outside of the housing 10, as shown in broken outline in FIG. 3, in a wrap around configuration in areas where the ambient temperature is high or where the tank is able to be mounted on a roof or in another position which is at least partly exposed to the sun. In such a situation, the heat pump operates at least partly as an air source heat pump.

In tests conducted by the Solar Energy Laboratory of the University of New South Wales, the performance of a solar boosted heat pump water heater having a heater arrangement according to the above described preferred embodiment was compared with a solar boosted heat pump water heater having a finned heat exchanger arrangement of the type described above and it was found that the average coefficient of performance of the water heater incorporating the heat exchanger embodying the present invention was approximately 11.2% better than that of the prior art arrangement for virtually identical test conditions. The test result may be summarized as follows:

Old Style Unit (Inserted finned tube condenser)
  Test Period: 3-31 May 1985 (29 days)
  Average Ambient Temperature: 15.8° C.
  Average Solar Irradiation: 12.7 $MJ/m^2/day$
  Average Overall System Coefficient of Performance: 2.48

New Style Unit (condenser coil wrapped around cylinder)
  Test Period: 3-31 Jul. 1985 (29 days)
  Average Ambient Temperature: 12.4° C.
  Average Solar Irradiation: 13.7 $MJ/m^2/day$
  Average Overall System Coefficient of Performance: 2.76

Both periods provided virtually identical test conditions for solar heat pump operation. In Jul. slightly lower average ambient temperature combined with slightly higher average solar irradiation to balance out and produce almost the same climatic conditions.

The COP achieved in Jul. was however approximately an 11.2% improvement on the May figure.

In both cases the average water discharge temperature on the same load pattern approximated 57° C.

We claim:

1. A water heater comprising:
   a generally cylindrical water tank having a wall formed from material having heat transfer properties;
   a cold water inlet adjacent one end of the tank;
   a hot water outlet adjacent the other end of the tank;
   a tube comprising iron adapted to carry a refrigerant fluid and helically wound externally about said tank wall with the helical windings being axially spaced one from the other;
   heat-conductive bonding material substantially coextensive with the length of said tube disposed solely directly between said tube and said tank wall for securing said tube and said tank wall substantially continously one to the other, leaving the tank wall between the helical windings of said tube free of bonding material, said tube and heat-conductive bonding material being in heat-conductive relation with said tank wall through its external surface to transfer heat from condensation of refrigerant fluid in said tube through said wall to the water contained in the tank, said tube about said tank being under tension to reduce the likelihood of the heat-conductive bonding material breaking during expansion and contraction of the tube and tank during use;
   said tube extending from a position adjacent said one end of the tank to a position not exceeding about 75% of the length of said wall of said tank;
   an evaporator positioned to be exposed to ambient conditions for absorbing heat energy from said ambient conditions and having a passage for carrying the refrigerant fluid whereby such fluid may be heated by said ambient conditions; and
   a compressor connected to said passage and to said tube to circulate refrigerant fluid through said tube and to said evaporator.

2. The water heater of claim 1, wherein said tank wall is metallic and said tube is made from material having a substantially similar coefficient of thermal expansion as said tank wall.

3. The water heater of claim 2, wherein said tube about said tank is under tension to reduce the likelihood of the heat conductive bonding material breaking during expansion and contraction of the tube and tank during use.

4. The water heater of claim 1, wherein said tank is a vertically standing cylindrical tank and the tube extends from a position adjacent the bottom of the tank to a position approximately 50% to 70% of the height of the tank.

5. The water heater of claim 4, wherein said tube extends to a position approximately 66% of the height of the tank.

6. The water heater of claim 4, wherein at least one turn of said tube is located below said cold water inlet.

7. The water heater according to claim 1 wherein said evaporator comprises a solar collector panel having said passage through which the refrigerant fluid is circulated in heat-conductive relationship with said panel, means defining an inlet to said collector for flowing the fluid into the collector passage, said panel being secured to a support which holds the panel in an outwardly bowed configuration to thereby increase the effective strength of the panel.

8. The water heater according to claim 7 wherein said collector is disposed with one end elevated with respect to the other end, said refrigerant fluid inlet to the collector being positioned at said elevated end, said panel being formed of heat-conductive, sheet material.

9. The water heater according to claim 1 wherein said evaporator comprises flat, heat-conductive, sheet material forming a panel having a plurality of passages through which the refrigerant fluid is circulated in a heat conductive relation with said panel, means defining a manifold passage at each of the opposite ends of said passages and connecting one to the other, the passage which is first connected to said manifold passage at one end of said panel being last connected to said manifold passage at the opposite end of said panel.

10. The water heater according to claim 1 including an insulated casing surrounding said tank, said compressor being positioned on top of said casing, and means for externally insulating said compressor.

11. The water heater according to claim 1 wherein said tube has a D-shaped cross-section with the flat side of said D-shaped cross-section bearing against said water tank.

12. A water heater comprising:
a generally cylindrical water tank having a wall formed from material having heat transfer properties;
a cold water inlet adjacent one end of the tank;
a hot water outlet adjacent the other end of the tank;
a tube adapted to carry a refrigerant fluid and helically wound externally about said tank wall with the helical windings being axially spaced one from the other, said tube having a generally D-shaped cross-section with the flat side of the D-shaped cross-section bearing against said tank;
heat-conductive bonding material substantially coextensive with the length of said tube disposed solely directly between said flat side of said D-shaped tube and said tank wall for securing said tube and said tank wall substantially continuously one to the other, leaving the tank wall between the helical windings of said tube free of bonding material, said tube and heat-conductive bonding material being in heat-conductive relation with said tank wall through its external surface to transfer heat from condensation of refrigerant fluid in said tube through said wall to the water contained in the tank, said tube about said tank being under tension to reduce the likelihood of the heat-conductive bonding material breaking during expansion and contraction of the tube and tank during use;
said tube extending from a position adjacent said one end of the tank to a position not exceeding about 75% of the length of said wall of said tank;
an evaporator positioned to be exposed to ambient conditions for absorbing heat energy from said ambient conditions and having a passage for carrying the refrigerant fluid whereby such fluid may be heated by said ambient conditions; and
a compressor connected to said passage and to said tube to circulate refrigerant fluid through said tube and to said evaporator.

13. The water heater according to claim 12 wherein said tank wall is metallic and said tube is formed from material having a substantially similar coefficient of thermal expansion as said tank wall.

14. The water heater according to claim 12 wherein said tank is a vertically standing cylindrical tank and the tube extends from a position adjacent the bottom of the tank to a position approximately 50% to 70% of the height of the tank.

15. The water heater according to claim 14 wherein said tube extends to a position approximately 66% of the height of the tank.

16. The water heater according to claim 14 wherein at least one turn of said tube is located below said cold water inlet.

17. The water heater according to claim 12 wherein said evaporator comprises flat, heat-conductive, sheet material forming a panel having a plurality of passages through which the refrigerant fluid is circulated in a heat conductive relation with said panel, means defining a manifold passage at each of the opposite ends of said passages and connecting one to the other, the passage which is first connected to said manifold passage at one end of said panel being last connected to said manifold passage at the opposite end of said panel.

18. The water heater according to claim 12 wherein said evaporator comprises a solar collector panel having said passage through which the refrigerant fluid is circulated in heat-conductive relationship with said panel, means defining an inlet to said collector for flowing the fluid into the collector passage, said panel being secured to a support which holds the panel in an outwardly bowed configuration to thereby increase the effective strength of the panel.

19. The water heater according to claim 18 wherein said collector is disposed with one end elevated with respect to the other end, said refrigerant fluid inlet to the collector being positioned at said elevated end.

20. The water heater according to claim 12 including an insulated casing surrounding said tank, said compressor being positioned on top of said casing, and means for externally insulating said compressor.

* * * * *